US012651418B2

(12) United States Patent
Healey et al.

(10) Patent No.: US 12,651,418 B2
(45) Date of Patent: Jun. 9, 2026

(54) SPATIAL DOCUMENT SYSTEM AND METHOD

(71) Applicant: Adobe Inc., San Jose, CA (US)

(72) Inventors: Jennifer Healey, San Jose, CA (US);
Tong Sun, San Ramon, CA (US);
Nicholas Rewkowski, San Jose, CA
(US); Nedim Lipka, Campbell, CA
(US); Curtis Wigington, San Jose, CA
(US); Alexa Siu, San Jose, CA (US)

(73) Assignee: Adobe Inc., San Jose, CA (US)

( * ) Notice: Subject to any disclaimer, the term of this
patent is extended or adjusted under 35
U.S.C. 154(b) by 368 days.

(21) Appl. No.: 18/317,851

(22) Filed: May 15, 2023

(65) Prior Publication Data

US 2024/0386675 A1 Nov. 21, 2024

(51) Int. Cl.
| | |
|---|---|
| *G06T 19/00* | (2011.01) |
| *G10L 15/08* | (2006.01) |
| *G10L 15/22* | (2006.01) |

(52) U.S. Cl.
CPC ............ *G06T 19/006* (2013.01); *G10L 15/08*
(2013.01); *G10L 15/22* (2013.01); *G06T*
*2219/004* (2013.01); *G10L 2015/088* (2013.01)

(58) Field of Classification Search
CPC . G06T 19/006; G06T 2219/004; G10L 15/08;
G10L 15/22; G10L 2015/088; G10L
15/26
See application file for complete search history.

(56) References Cited

U.S. PATENT DOCUMENTS

| | | | | |
|---|---|---|---|---|
| 7,627,556 | B2 * | 12/2009 | Liu | G06F 16/583 |
| 11,521,018 | B1 * | 12/2022 | Barzelay | G06T 11/60 |
| 11,721,333 | B2 * | 8/2023 | Lee | G06F 16/5854 |
| | | | | 704/232 |

(Continued)

FOREIGN PATENT DOCUMENTS

| | | | | |
|---|---|---|---|---|
| CN | 107919127 A | * | 4/2018 | G10L 15/02 |
| CN | 110430356 A | * | 11/2019 | G10L 15/22 |

(Continued)

OTHER PUBLICATIONS

"Adding Editable Text", https://sparkar.facebook.com/ar-studio/learn/
articles/2D/editable-text/, (Accessed on Feb. 6, 2023).
(Continued)

*Primary Examiner* — Xiao M Wu
(74) *Attorney, Agent, or Firm* — Kilpatrick Townsend &
Stockton LLP

(57) ABSTRACT

A computing system captures image data using a camera and
captures spatial information using one or more sensors. The
computing system receives voice data using a microphone.
The computing system analyzes the voice data to identify a
keyword. The computing system analyzes the image data
and the spatial information to identify an object correspond-
ing to the keyword. The computing system generates text
based on the voice data and the keyword. The computing
system stores the text in association with the object. The
computing system generates and provides output comprising
the text linked to the object or a derivative thereof.

17 Claims, 11 Drawing Sheets
(7 of 11 Drawing Sheet(s) Filed in Color)

(56) References Cited

U.S. PATENT DOCUMENTS

| | | | | |
|---|---|---|---|---|
| 2015/0154232 A1* | 6/2015 | Ovsjanikov | ......... | G06F 16/5838 |
| | | | | 707/780 |
| 2017/0103072 A1* | 4/2017 | Yuen | ................... | G06F 16/5846 |
| 2019/0187479 A1* | 6/2019 | Nishizawa | ............ | G06F 3/0304 |
| 2019/0332657 A1* | 10/2019 | Jones | ..................... | G16H 30/40 |
| 2020/0258517 A1* | 8/2020 | Park | ........................ | G10L 15/22 |
| 2021/0232836 A1* | 7/2021 | Graefe | ................... | G06V 20/58 |
| 2021/0304451 A1* | 9/2021 | Fortier | ................... | G10L 15/22 |
| 2023/0055477 A1* | 2/2023 | Mohajer | ................. | G10L 15/08 |

FOREIGN PATENT DOCUMENTS

| | | | | | |
|---|---|---|---|---|---|
| GB | 2546368 A | * | 7/2017 | ......... | G06F 16/5846 |
| KR | 20190115839 A | * | 10/2019 | ............ | G10L 15/02 |
| WO | WO 2018133307 A1 | * | 7/2018 | ............... | G06F 3/01 |

OTHER PUBLICATIONS

"AR anchor manager", AR Foundation, 4.1.13 (unity3d.com), (Accessed on Feb. 6, 2023).

"Content Persistence Fundamentals" 2019. Magic Leap. https://ml1-developer.magicleap.com/en-us/learn/guides/content-persistence-fundamentals. (Updated Oct. 23, 2019; Accessed on Mar. 10, 2022).

"Creating screen annotations for objects in an AR experience", https://developer.apple.com/documentation/arkit/content_anchors/creating_screen_annotations_for_objects_in_an_ar_experience, (Accessed on Feb. 6, 2023).

"HoloLens." 2022. Spatial anchors—Mixed Reality | Microsoft Docs. https://docs.microsoft.com/en-us/windows/mixed-reality/design/spatial-anchors (Accessed on Mar. 10, 2023).

"Tutorial on voice and text annotations with the HoloLens", (codeholo.com), (Accessed on Feb. 6, 2023).

"Working with Anchor", ARCore, Google Developers, (Accessed on Feb. 6, 2023).

Beck, Stephan, Andre Kunert, Alexander Kulik, and Bernd Froehlich. 2013. Immersive group-to-group telepresence. IEEE transactions on visualization and computer graphics 19, 4 (2013), 616-625.

Bertasius, Gedas and Lorenzo Torresani. 2021. Classifying, Segmenting, and Tracking Object Instances in Video with Mask Propagation. arXiv:1912.04573.

Breunig, Martin, Patrick Erik Bradley, Markus Jahn, Paul Kuper, Nima Mazroob, Norbert Rösch, Mulhim Al-Doori, Emmanuel Stefanakis, and Mojgan Jadidi. 2020. Geospatial data management research: Progress and future directions. ISPRS International Journal of Geo-Information 9, 2 (2020), 95.

Caarls, Jurjen, Pieter Jonker, and Stelian Persa. 2003. Sensor fusion for augmented reality. In European Symposium on Ambient Intelligence. Springer, 160-176.

Caron, Francois, Emmanuel Duflos, Denis Pomorski, and Philippe Vanheeghe. 2006. GPS/IMU data fusion using multisensor Kalman filtering: introduction of contextual aspects. Information fusion 7, 2 (2006), 221-230.

Cheah, Thomas CS Cheah and K-W Ng. 2005. A practical implementation of a 3D game engine. In International Conference on Computer Graphics, Imaging and Visualization (CGIV'05). IEEE, 351-358.

Gaillard, Jeremy, Adrien Peytavie, and Gilles Gesquière. 2016. A Data Structure for Progressive Visualisation and Edition of Vectorial Geospatial Data. In 3D GeoInfo, vol. 2. 201-209.

Guan, Peiyu, Zhiqiang Cao, Erkui Chen, Shuang Liang, Min Tan, and Junzhi Yu. 2020. A real-time semantic visual SLAM approach with points and objects. International Journal of Advanced Robotic Systems 17, 1 (2020), 1729881420905443. https://doi.org/10.1177/1729881420905443arXiv:https://doi.org/10.1177/1729881420905443.

Jiang, Jade, Michael Tobia, Robert Lawther, Dominic Branchaud, and Tomasz Bednarz. 2020. Double vision: Digital twin applications within extended reality. In ACM SIGGRAPH 2020 Appy Hour. 1-2.

Khan, Latif U., Walid Saad, Dusit Niyato, Zhu Han, and Choong Seon Hong. 2021. Digital-Twin-Enabled 6G: Vision, Architectural Trends, and Future Directions. arXiv preprint arXiv:2102.12169 (2021).

Klosowski, James T., Martin Held, Joseph SB Mitchell, Henry Sowizral, and Karel Zikan. 1998. Efficient collision detection using bounding volume hierarchies of k-DOPs. IEEE transactions on Visualization and Computer Graphics 4, 1 (1998), 21-36.

Li, L. and Michael F. Goodchild. 2011. "Automatically and Accurately Matching Objects in Geospatial Datasets", Remote Sensing and Spatial Information Sciences,, vol. 38, Part II, pp. 98-103.

Mazurek, Patryk, and Tomasz Hachaj. 2021. SLAM-OR: Simultaneous Localization, Mapping and Object Recognition Using Video Sensors Data in Open Environments from the Sparse Points Cloud. Sensors 21, 14.

Nicholson, Lachlan, Michael Milford, and Niko Sünderhauf. 2018. QuadricSLAM: Dual Quadrics from Object Detections as Landmarks in Object-oriented SLAM. arXiv:1804.04011 [cs.RO].

Orts-Escolano, Sergio, Christoph Rhemann, Sean Fanello, Wayne Chang, Adarsh Kowdle, Yury Degtyarev, David Kim, Philip L Davidson, Sameh Khamis, Mingsong Dou, et al. 2016. Holoportation: Virtual 3d teleportation in real-time. In Proceedings of the 29th annual symposium on user interface software and technology. 741-754.

Pillai, Sudeep and John Leonard. 2015. Monocular SLAM Supported Object Recognition. arXiv:1506.01732 [cs.RO].

Raskar, Ramesh, GregWelch, Matt Cutts, Adam Lake, Lev Stesin, and Henry Fuchs. 1998. The office of the future: A unified approach to image-based modeling and spatially immersive displays. In Proceedings of the 25th annual conference on Computer graphics and interactive techniques. 179-188.

Redmon and Farhadi, YOLO 9000: Better, Faster, Stronger, arXiv:1612.08242 (2016).

Schall, Gerhard, Daniel Wagner, Gerhard Reitmayr, Elise Taichmann, Manfred Wieser, Dieter Schmalstieg, and Bernhard Hofmann-Wellenhof. 2009. Global pose estimation using multi-sensor fusion for outdoor augmented reality. In 2009 8th IEEE International symposium on mixed and augmented reality. IEEE, 153-162.

Sowizral, Henry, 2000. Scene graphs in the new millennium. IEEE Computer Graphics and Applications 20, 1 (2000), 56-67.

Wang, Guangting, Chong Luo, Xiaoyan Sun, Zhiwei Xiong, and Wenjun Zeng. 2020. Tracking by Instance Detection: A Meta-Learning Approach.arXiv:2004.00830.

Weng, Xinshuo, Jianren Wang, David Held, and Kris Kitani. 2020. 3D Multi-Object Tracking: A Baseline and New Evaluation Metrics. arXiv:1907.03961.

Zhang, Pifu, Jason Gu, Evangelos E Milios, and Peter Huynh. 2005. Navigation with IMU/GPS/digital compass with unscented Kalman filter. In IEEE International Conference Mechatronics and Automation, 2005, vol. 3. IEEE, 1497-1502.

Zhang, Jun, Mina Henein, Robert Mahony, and Viorela Ila. 2020. VDO-SLAM: A Visual Dynamic Object-aware SLAM System. (2020). arXiv:2005.11052.

Zhou, Xingyi, Vladlen Kollun, and Philipp Kr.henbühl. 2020. Tracking Objects as Points, arXiv:2004.01177.

* cited by examiner

200

202

CAPTURE IMAGE DATA USING A CAMERA

204

CAPTURE SPATIAL INFORMATION USING SENSORS

206

RECEIVE VOICE DATA USING A MICROPHONE

208

ANALYZE THE VOICE DATA TO IDENTIFY A KEYWORD

210

ANALYZE IMAGE DATA AND SPATIAL INFORMATION TO IDENTIFY AN OBJECT CORRESPONDING TO THE KEYWORD

212

GENERATE TEXT BASED ON THE VOICE DATA AND THE KEYWORD

214

STORE THE TEXT IN ASSOCIATION WITH THE OBJECT

216

GENERATE AND PROVIDE OUTPUT COMPRISING THE TEXT LINKED TO THE OBJECT OR A DERIVATIVE THEREOF

*FIG. 2*

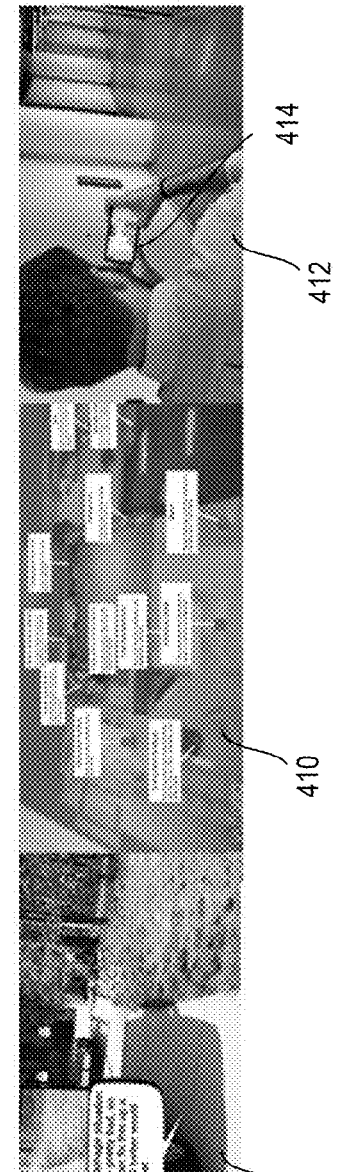
- AR capture everything
  402
- Anchor creation pipeline
  404
- Consumption
  406
*FIG. 4*

SPATIAL DOCUMENT SYSTEM AND METHOD

TECHNICAL FIELD

This disclosure generally relates to extended reality. More specifically, but not by way of limitation, this disclosure relates to tracking spatial relationships and linking objects to associated text to allow users to create and consume "spatial documents."

BACKGROUND

Various applications and digital environments exist in which a computer-generated or virtual object is displayed on a screen within a digital environment. Extended reality (XR) combines real-world tracking with digital features such as digital images or annotations. One type of XR is augmented reality (AR), in which real-world and computer-generated content are combined. Another type of XR is mixed reality (MR), in which a real-world environment is integrated with a computer-generated environment. Another type of XR is virtual reality (VR), in which a virtual world is presented to create an immersive experience.

In some XR environments, a computing system tracks objects in the real-world environment (e.g., a couch, a pair of scissors, a tree, and so forth). One popular technique for real-world object tracking is simultaneous localization and mapping (SLAM), which uses visual and spatial information to track the real-world environment. A great deal of work is being done in these fields, including complex tracking of physical environments. However, there are still situations where tracking is relatively imprecise or unreliable. Moreover, generating and configuring XR content is a complex task, and it is traditionally difficult and time-consuming for a user to configure such content.

SUMMARY

The present disclosure describes techniques for tracking spatial relationships and linking real-world or computer-generated objects to associated text to allow users to create and consume "spatial documents."

In some embodiments, a computing system authors and interacts with "spatial documents," a hierarchical document structure where segments of text are associated with physical "anchor" locations, which may correspond to an object in a real-world scene, image, and/or XR environment. The spatial documents can further be associated with semantic space information and an orientation within a frame. The computing system can generate such spatial documents using live capture of narrative along with sensor, image, and video data from a relatively simple computing device such as a mobile device (smartphone). Based on capturing image data, sensor data, and audio data in the form of user narration (and/or text input), the computing system derives the narrative segmentation, anchor locations, semantic place associations, and associations between anchors and text.

The spatial documents can be used as an immerse experience in Augmented and Mixed Reality. Alternatively, or additionally, the document can also be consumed in Virtual Reality (VR) (both reconstructed from the video stream or imposed on a similar synthetic VR structure) and as a flattened two-dimensional (2D) document (e.g., a flattened image generated from the captured stream, anchored text superimposed on a map, or as a hyperlinked document).

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Certain text portions in FIGS. 3, 4, 5, 7, and 9 are included as examples of text regions. The specific content of the text in these portions is not material or intended to be completely legible.

Features, embodiments, and advantages of the present disclosure are better understood when the following Detailed Description is read with reference to the accompanying drawings.

Figure 1:
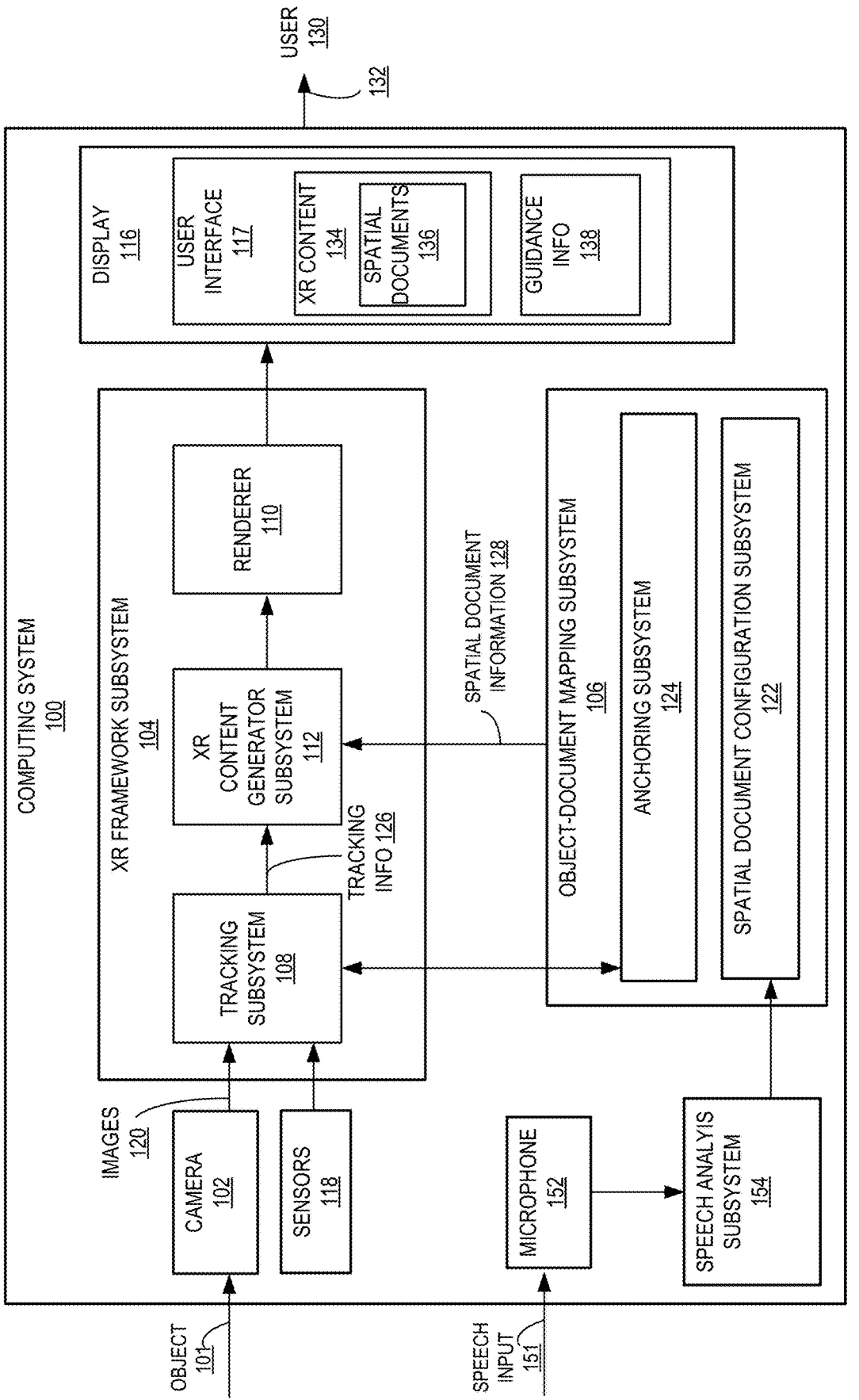

FIG. 1 depicts an example of a computing system for spatial document configuration and presentation, according to certain embodiments of the present disclosure.

FIG. 2 depicts an example of a flow for spatial document configuration and presentation, according to certain embodiments of the present disclosure.

Figure 3:
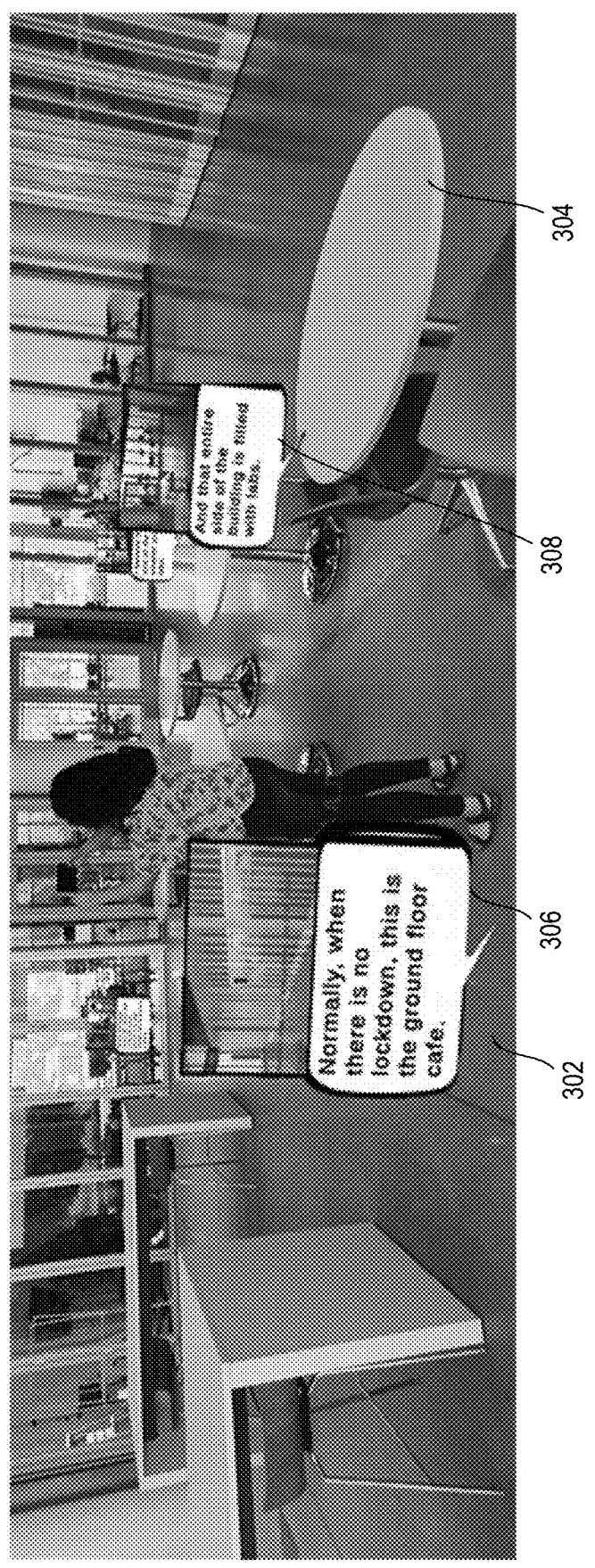

FIG. 3 depicts an example spatial document, according to certain embodiments of the present disclosure.

FIG. 4 is a high level schematic overview illustrating example spatial document generation techniques, according to certain embodiments of the present disclosure.

Figure 5:
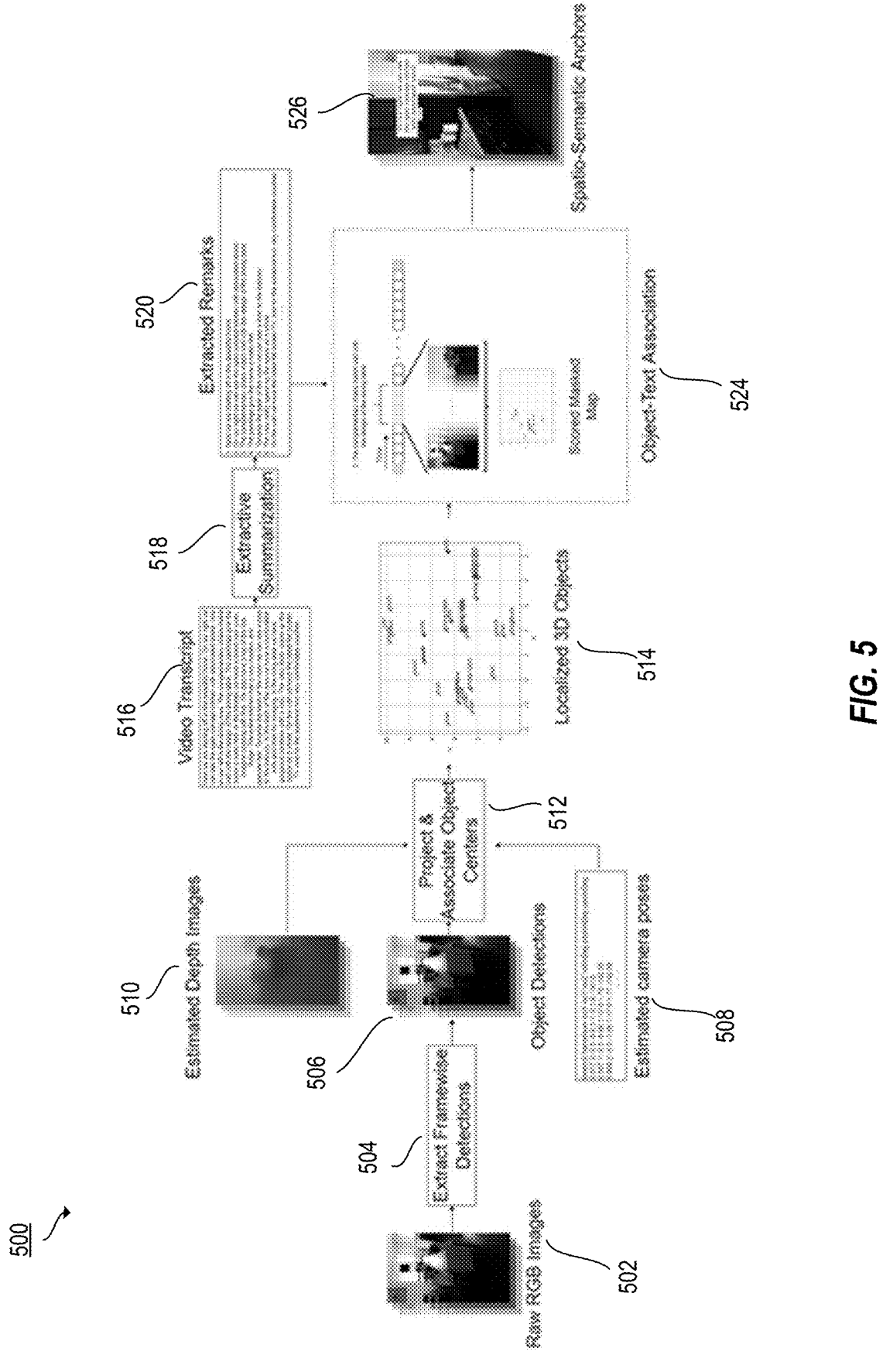

FIG. 5 depicts a schematic overview of example spatial document generation techniques, according to certain embodiments of the present disclosure.

Figure 6:
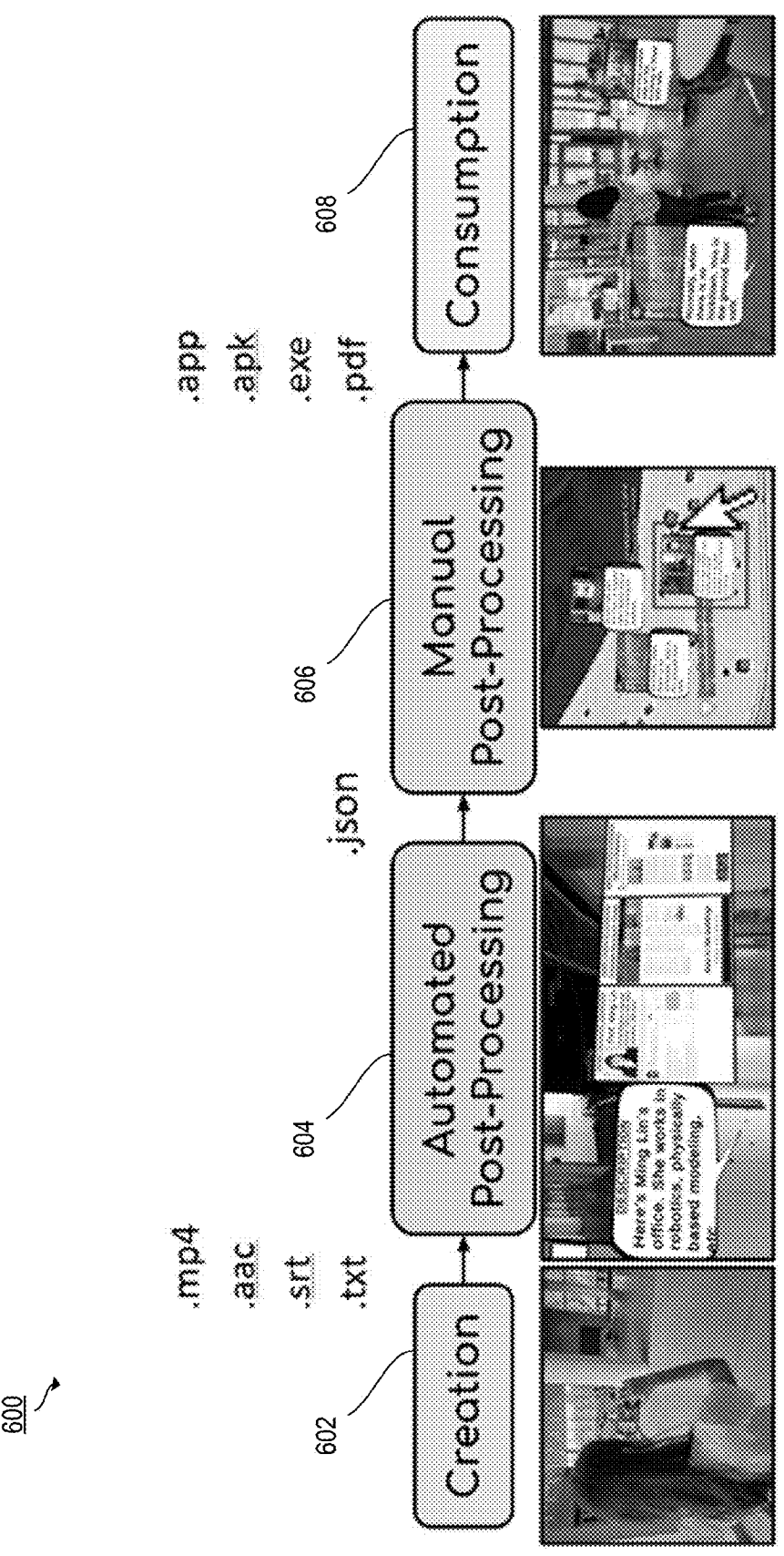

FIG. 6 depicts an example flow for a spatial document generation and consumption pipeline, according to certain embodiments of the present disclosure.

Figure 7:
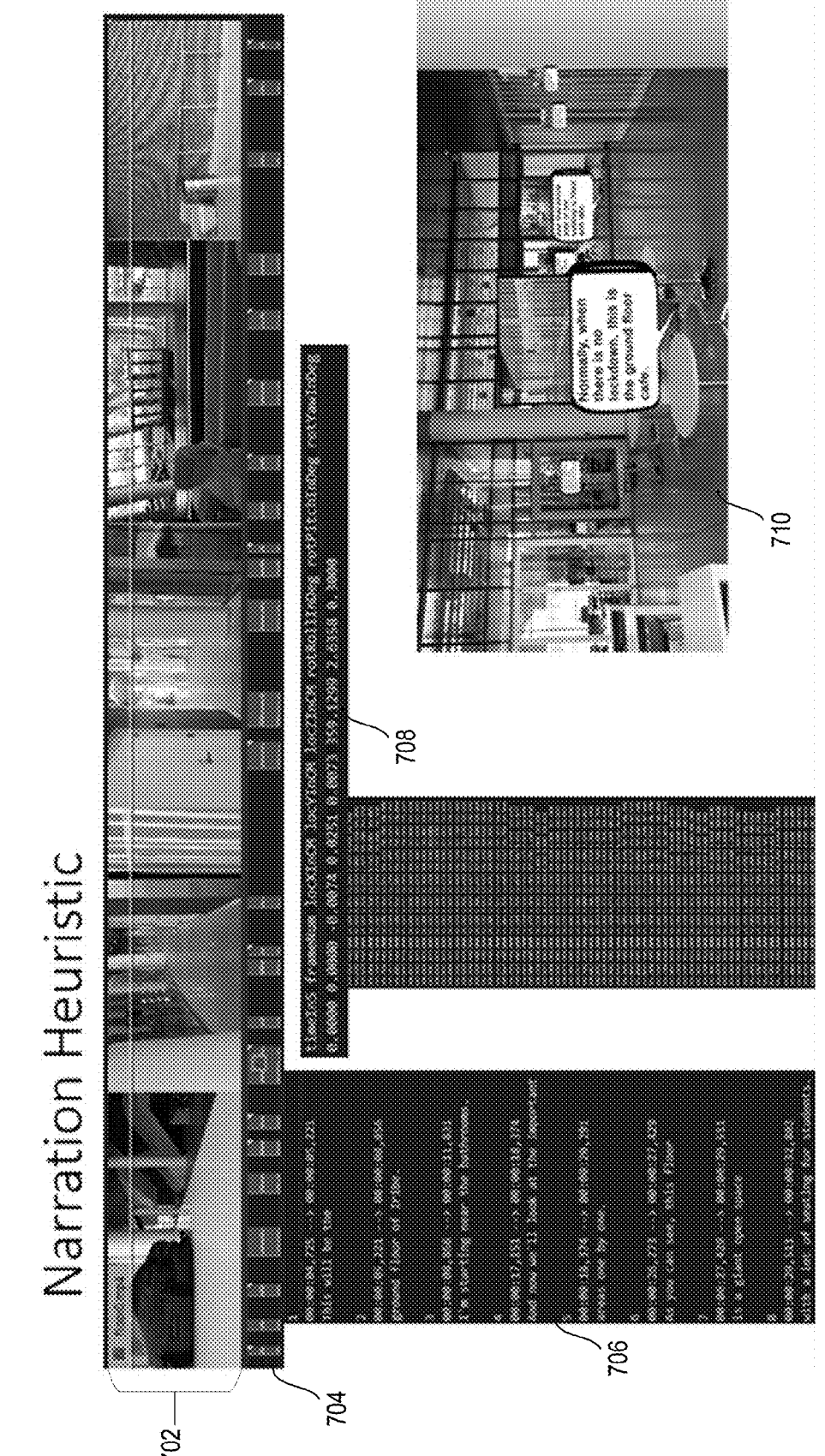

FIG. 7 is a schematic diagram of an audio pipeline, according to certain embodiments of the present disclosure.

Figure 8:
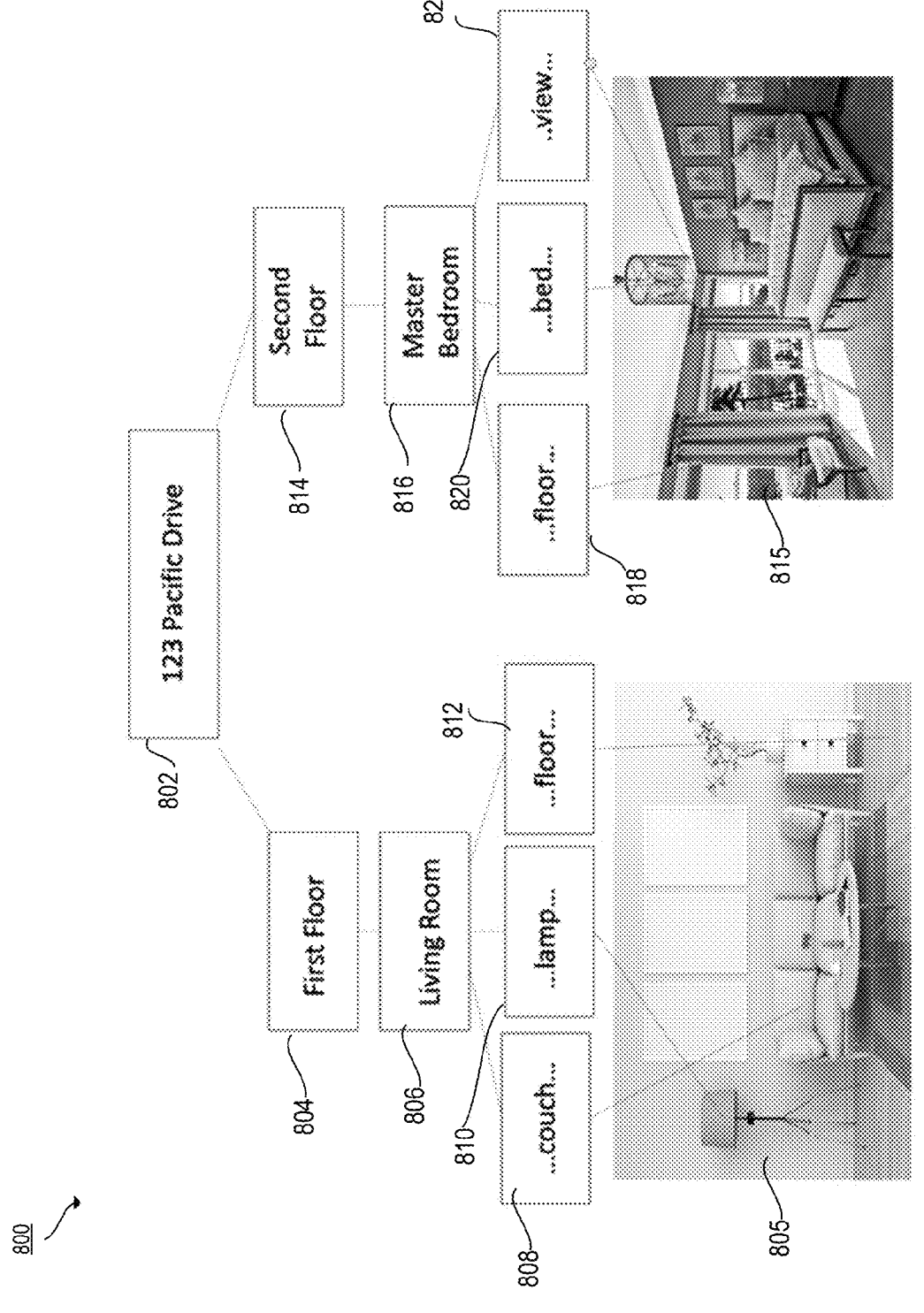

FIG. 8 depicts an example spatial document hierarchy, according to certain embodiments of the present disclosure.

Figure 9:
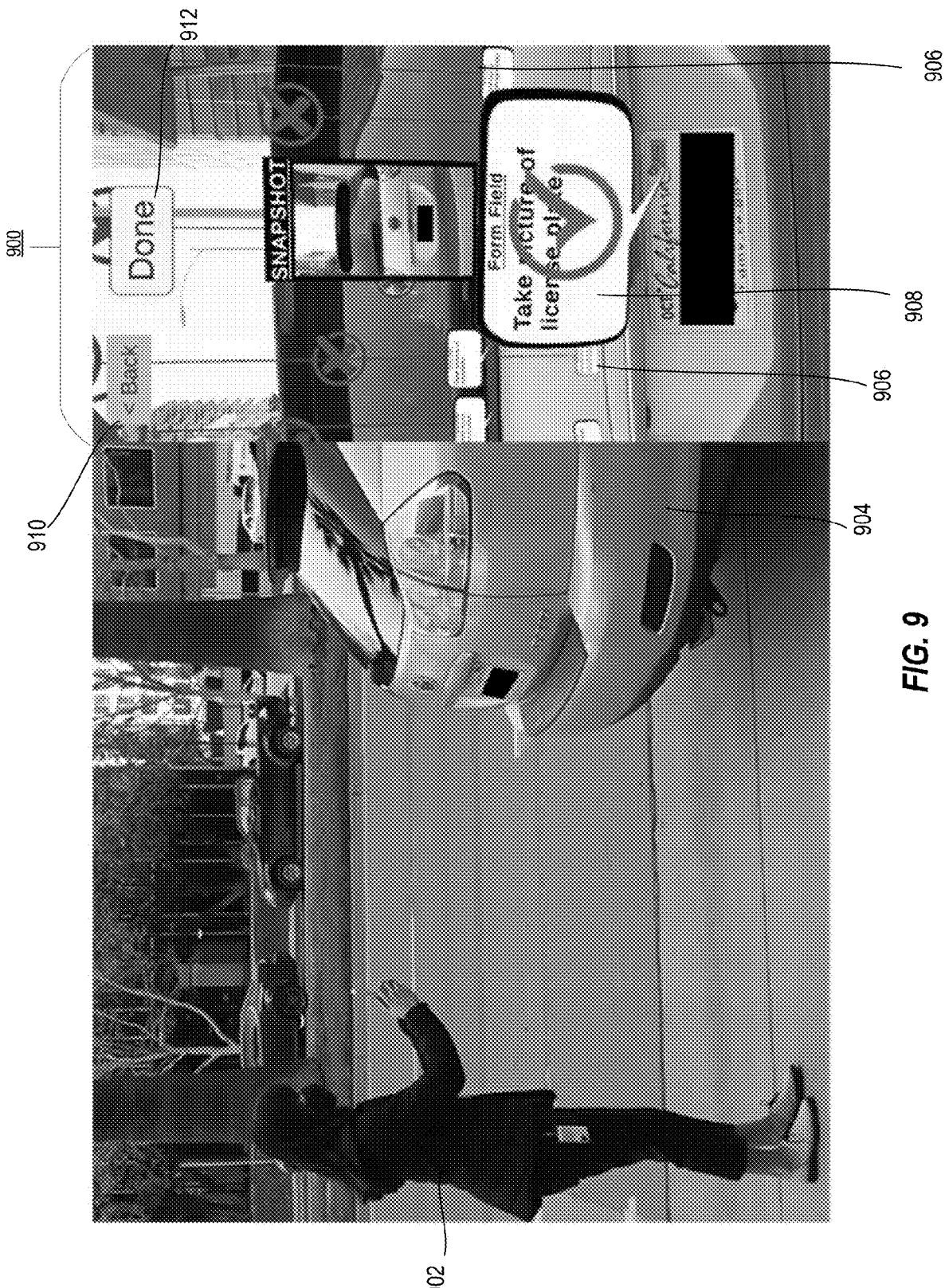

FIG. 9 depicts an example user interface, according to certain embodiments of the present disclosure.

Figure 10:
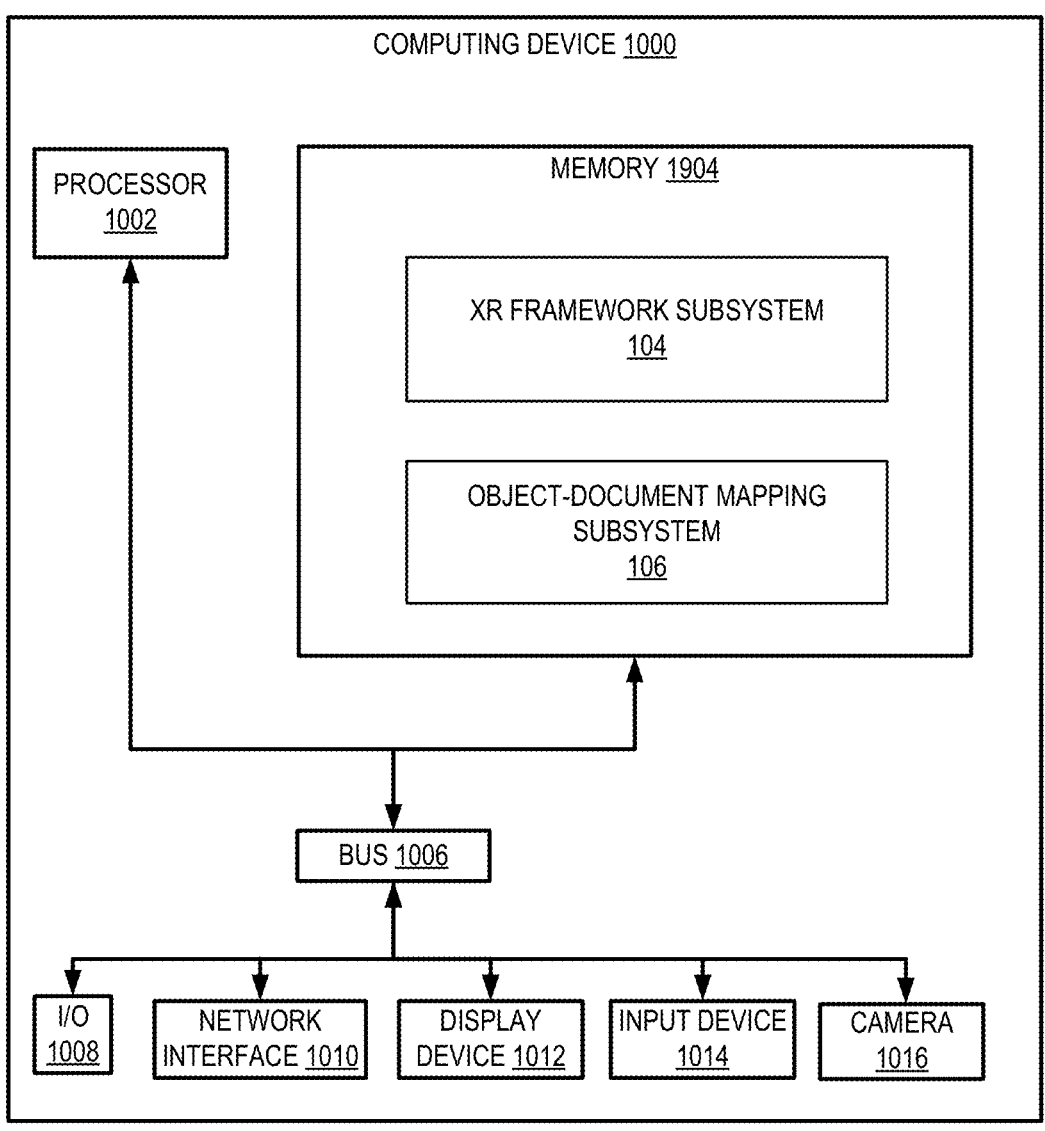

FIG. 10 depicts an example of a computing system that performs certain operations described herein, according to certain embodiments of the present disclosure.

Figure 11:
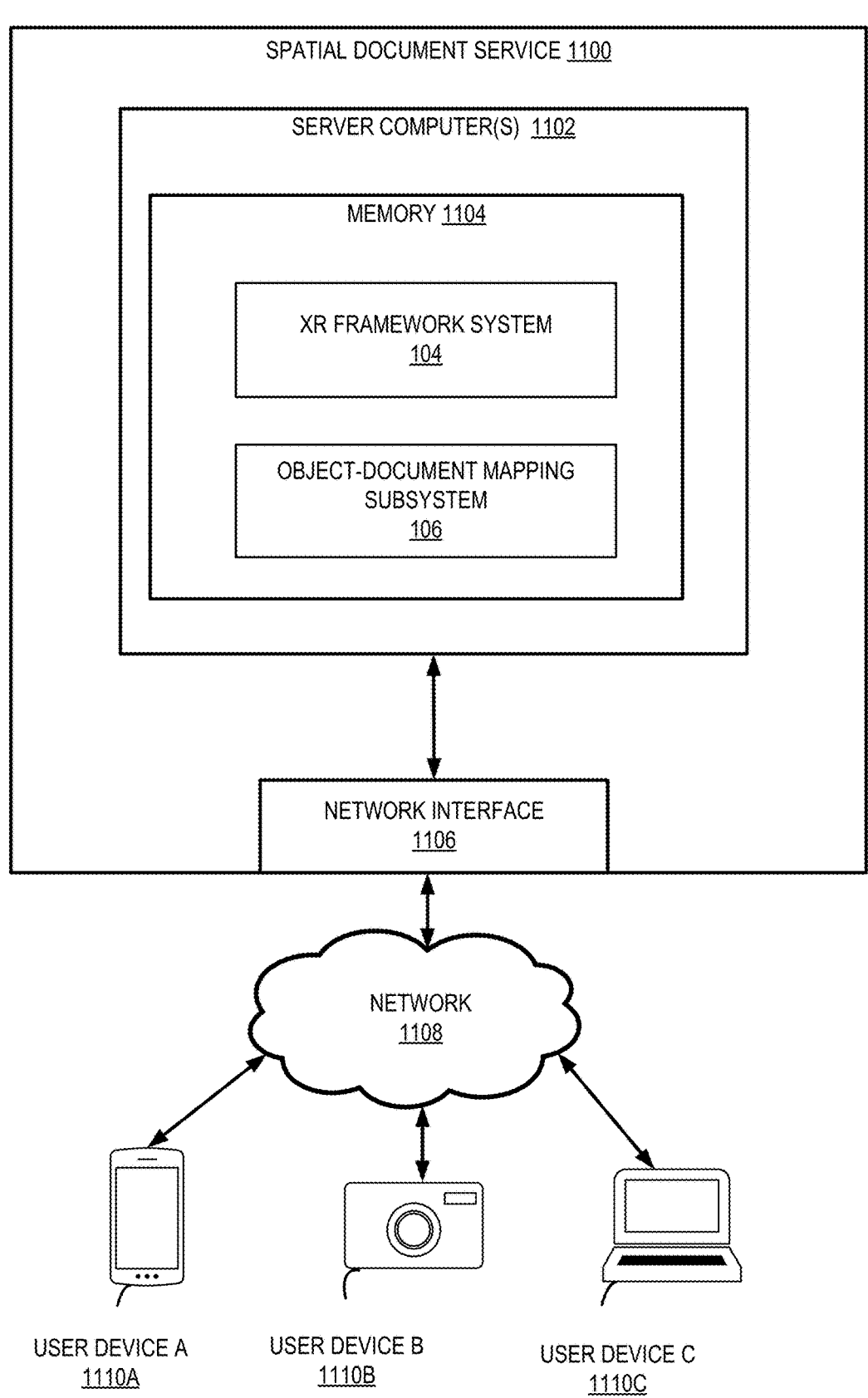

FIG. 11 depicts another example of a computing system that performs certain operations described herein, according to certain embodiments of the present disclosure.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" is used herein to mean "serving as an example, instance, or illustration." Any embodiment or design described herein as "an example" is not necessarily to be construed as preferred or advantageous over other embodiments or designs. Various embodiments are described herein, including methods, systems, non-transitory computer-readable storage media storing programs, code, or instructions executable by one or more processors, and the like.

The present disclosure describes techniques for generating and providing an interactive, multimodal summarization of a real, recorded experiences at specific places in the form of "spatial documents." The system gathers information including image data (e.g., in the form of video data), sensor data (e.g., from various sensors on smartphone including GPS (Global Positioning System), gyroscope, pressure, etc.), and sound data (e.g., recorded audio detected by a microphone). This information is analyzed to identify objects and narration associated with the objects. Text is extracted from the narration and stored in association with the object to form a spatial document. The spatial document can include one or more text portions, as well as data describing a location in space at which to present the document, and various other data and metadata including preferred pose, creation date, and more, as described herein. The spatial documents can then be consumed or presented to a user in various formats. For example, in an AR environment, as a user points their phone to the same object that is associated with a spatial document, the spatial document is displayed such as in a text bubble emanating from the object. Alternatively, or additionally, the spatial document can be presented in a VR environment, over a two-dimensional image, or in various other contexts as described herein.

To create a spatial document structure, a user simply needs traverse either an indoor or outdoor space and speak to describe the information they want to record. The computing system associates key aspects of the dialog with captured spatial and visual information. The resulting spatial document is a construct that allows users to re-experience the narrative in multiple ways (e.g., different spatial views). These documents can store information like a traditional document such as a PDF (Portable Document Format) document, but in addition to the content itself, pieces of information may also contain the object-level mapping required to visualize the information in XR with high accuracy. The spatial documents are also authorable and expandable, with intelligence to build a semantic understanding of the documented scene. Each document can automatically improve itself as more people create spatial documents of a given space. Additionally, spatial documents offer the ability to link multiple documents, including forms, agreements, contracts, and publications, to multiple spatial features such as buildings, utility lines, interest point/locations, etc.

Referring now to the drawings, FIG. 1 depicts an example of a computing system 100 including an object-document mapping subsystem 106 for configuring and displaying spatial documents within an XR scene in cooperation with an XR framework subsystem 104, according to certain embodiments. In the example depicted in FIG. 1, a camera 102 captures images including an object 101, which is a real-world object. In some implementations, sensors 118 also capture positional and other information. The object-document mapping subsystem 106, in conjunction with the XR framework subsystem 104, executes operations for performing one or more functions used in configuring and displaying spatial documents 136. The spatial documents 136 are shown to a user 130 as output 132 via a display 116.

In some aspects, the computing system 100 is implemented in a computing device such as a smartphone, tablet, or laptop computer. Alternatively, or additionally, such a computing device can work in concert with one or more cloud servers and/or cloud storage devices.

The camera 102 includes hardware and/or software configured to capture images 120 (e.g., a series of frames making up video content) including an object 101 (e.g., a real-world object) and surrounding real-world environment. In some examples, the images 120 include live images that capture a view of the observable real-world environment corresponding to the field of view of the camera 102. The live images may correspond to one or more still images and/or live video.

In some embodiments, the camera 102 includes one or more elements for capturing the images 120 including the object 101. Examples of such elements include a Charge-Coupled Device (CCD) and a Complementary Metal-Oxide-Semiconductor (CMOS) image sensor. The camera 102 is communicatively coupled to the XR framework subsystem 104 and is configured to transmit the images 120 to the XR framework subsystem 104.

The sensors 118 include hardware and/or software capable of capturing information, including position and orientation information, associated with the computing system 100. The computing system 100 may include one or more types of sensors 118. Examples of types of sensors 118 include a gyroscope, a Global Positioning System (GPS) receiver, a Light Detection and Ranging (LIDAR) receiver, a sonar receiver, an accelerometer, a Passive InfraRed (PIR) sensor, a pressure sensor, and a camera (e.g., enabled with a filter to selectively receive infrared light).

The computing system 100 includes functionality to receive input from a user 130. In some embodiments, user input is received in the form of speech input 151 via a microphone 152. The microphone 152 is communicatively coupled to a speech analysis subsystem 154. The speech analysis subsystem 154 includes functionality to decode, parse and analyze speech 153 input 151. This can include natural language recognition, such as identifying specific words and phrases from the speech input 151. This can further include sentiment analysis and other natural language processing techniques for analyzing the speech input 151. Alternatively, or additionally, the computing system 100 receives user input via the display 116 (e.g., via a touchscreen). Alternatively, or additionally, the computing system 100 includes one or more buttons, a keyboard, mouse, and/or the like, for receiving user input.

The XR framework subsystem 104 includes hardware and/or software configured to generate an XR environment. In some embodiments, the XR framework subsystem 104 includes a tracking subsystem 108, an XR content generator subsystem 112, and a renderer 110.

In some embodiments, the tracking subsystem 108 is configured to perform tracking during a session. During a session, the tracking subsystem 108 is configured to maintain a correspondence between the real-world environment space that the computing system 100 inhabits and a virtual space where virtual XR content is modeled and placed. The tracking subsystem 108 includes hardware and/or software configured to track and calculate a position and orientation of the computing system 100 in a real-world environment and maintain a correspondence in virtual space in which the virtual object is modeled. The tracking subsystem 108 receives, as input, real-world scene information in the form of images 120 from the camera 102.

In some aspects, the tracking subsystem 108 also receives position and orientation information from one or more sensors 118 of computing system 100. The tracking subsystem 108 tracks and calculates the pose of the computing system 100 in real-time based upon information received from the camera 102 and/or sensors 118.

The object-document mapping subsystem 106 includes hardware and/or software configured to identify information for identifying and anchoring real-world or virtual reality (VR) objects (using an anchoring subsystem 124) and generating spatial documents and linking the spatial documents to the anchors (using a spatial document configuration subsystem 122) based on configuration parameters. The configuration parameters include information for positioning spatial documents based on position of a real-world or VR object. In some embodiments, the object-document mapping subsystem 106 receives user input establishing configuration parameters (e.g., via speech input 151 to the microphone 152 and/or user input to the user interface 117).

In some embodiments, the anchoring subsystem 124 establishes rules or algorithms used to identify objects 101 in a real-world or VR scene. This may be executed based on the configuration parameters established via user input as well as tracking information 126 established by the XR framework subsystem 104. For example, a user can indicate an object of interest by explicitly selecting it on a touch-screen, and/or by speaking as the computing system identifies keywords matching to identified objects.

In some embodiments, the spatial document configuration subsystem 122 establishes rules or algorithms used to generate spatial documents 136. This can include generating the spatial documents 136 based on user input, as well as linking the virtual documents to anchors, as described herein.

In some embodiments, the XR content generator subsystem 112 includes hardware and/or software configured to augment a real-world scene with virtual content. The XR content generator subsystem 112 generates XR content based upon information received from the tracking subsystem 108 and the object-document mapping subsystem 106. The XR content generator subsystem 112 receives the spatial document information 128 from the object-document mapping subsystem 106. The XR content generator subsystem 112 analyzes the tracking information 126 and the spatial document information 128 to determine an appropriate position for the spatial documents (e.g., text and associated information) with respect to the object 101 captured by the camera 102, for each image or frame of interest.

In some embodiments, the renderer 110 includes hardware and/or software configured to render the spatial documents 136. The renderer 110 overlays the spatial documents 136 on an image (e.g., a live camera image) in a position and orientation determined by the XR content generator subsystem 112 to form XR content 134. The renderer 110 transmits the XR content 134 to the display 116 for output.

In some embodiments, the display 116 includes hardware and/or software configured to present information in a visual form. For example, the display 116 is configured to display Graphical User Interface ("GUI") elements, text, images, video, and/or other data. The display 116 may include, or be communicatively coupled with, elements for receiving user input (e.g., the display 116 may be a touchscreen display). The display 116 presents the XR content 134 including the spatial documents 136. In some embodiments, the display 116 is part of an output device (e.g., a monitor, mobile phone, or the like which includes the display 116).

In some embodiments, the computing system includes a user interface 117 (e.g., a GUI) that is displayed to a user 130 via the display 116. The user interface 117 further displays output 132 including the XR content 134, including the spatial documents 136, to the user 130. In some aspects, the user interface 117 further displays guidance information ("info") 138. The guidance info 138 can guide a user to establish spatial documents, as described herein and illustrated in FIG. 9.

FIG. 2 depicts an example of a flow 200 for configuring and displaying spatial documents, according to certain embodiments. The operations described with respect to FIG. 2 may be executed by the components depicted in FIG. 1.

At step 202, the computing system captures image data. In some embodiments, the computing system captures the image data using a camera. For example, the camera captures video data which includes a series of images. As specific examples, a user points the camera, and may move the camera around a room or outdoor area. The camera captures a corresponding set of images.

At step 204, the computing system captures spatial information. In some embodiments, the computing system captures the spatial information using one or more sensors. For example, as a user positions the camera to capture images at step 202, the sensors also record orientation and motion data, which are stored in association with the image data (e.g., by storing each image and sensor reading with a corresponding timestamp). In some examples, the spatial information is sensor data recorded form a smart phone, using sensors including the camera, inertial measurement unit (IMU), microphone, GPS, compass as well as any user input from the phone as the user records. In some examples, pressure data is obtained using a pressure sensor and used to infer altitude (e.g., to identify what floor of a building one is one).

In some embodiments, the computing system uses simultaneous localization and mapping (SLAM) to track the spatial information in association with the image data. (See, e.g., Jun Zhang et al., "VDO-SLAM: A Visual Dynamic Object-aware SLAM System," arXiv:2005.11052 (2020)).

In some aspects, the computing system stores the audio/video and sensor data for later use. In some implementations, the computing system performs compression before storing the data. For example, image and video data is compressed using machine learning to compress the data using super sampling. The stored video can then be decompressed (or in some implementations used in compressed form) to identify salient details to perform tasks such as expanding on associated text, updating tracking information, and performing alignment. Alternatively, or additionally, larger videos or images can be stored to a remote server (e.g., cloud storage) and retrieved via a network connection when needed.

In some aspects, the computing system computes and stores secondary information to track the XR device during runtime, which obviates the need to recompute various parameters. In various examples, this secondary information includes estimated depth and confidence maps, 6-degree-of-freedom device pose, point clouds for each frame, detected surfaces/planes (which may be generated through visual odometry), weather information gathered from a weather API (Application Programming Interface), etc. This information is stored as a bundle used for computation or visualization elsewhere in the pipeline.

At step 206, the computing device receives voice data. In some embodiments, the computing system receives the voice data using a microphone. For example, as a user positions the camera to capture images depicting a scene in a room or outdoor are at step 202, the user narrates information about different objects in the scene. This narration is captured using the microphone. In some aspects, the voice data is stored in association with the image data captured at step 202 and/or the sensor data captured at step 204 (e.g., by storing image and voice data with corresponding timestamps). Alternatively, or additionally, other user input is received and stored, such as via typed input via a keyboard or touchscreen.

At step 208, the computing device analyzes the voice data to identify a keyword (or multiple keywords). In some aspects, analyzing the voice data includes transcribing any voice recording or text input to generate a transcription. The computing system analyzes the transcription by parsing the sentences based on temporal proximity. In some examples, the typical pause between sentences is set to some value (e.g., approximately 2 seconds).

In some examples, the computing system performs natural language processing (NLP) to identify the keyword. The NLP in some examples further includes performing sentiment analysis, intent determination, and other NLP tasks suitable for analyzing the voice data. In some aspects, the keyword or keywords are associated with one or more objects that the user is describing. For example, in the voice data, "This car is for sale for $9,000 and this truck is for sale for $13,000," "car" and "truck" are identified as keywords. In some aspects, the computing system analyzes the transcribed voice data to identify salient remarks associated with one or more keywords. For example, the remark "take a look at this view" is associated with the keyword "view," while the remark "the oven is new and top-of-the line" is associated with the keyword "oven."

At step 210, the computing system analyzes the image data and the spatial information to identify an object corresponding to the keyword. For example, the computing system uses an object detection algorithm such as YOLO (You Only Look Once) to detect objects in the image data, such as a couch, a painting, a car, and so forth. (See, e.g., Redmon and Farhadi, YOLO 9000: Better, Faster, Stronger, arXiv:1612.08242 (2016)). Alternatively, any suitable computer graphics and computer vision techniques can be used to extract the object of interest. The computing system further localizes the object, for example, by storing the three-dimensional coordinates of the object. This can be repeated for multiple or all objects in a given image.

In some aspects, the object identification process is informed by a keyword in the voice data. For example, if the voice data specifies a "Toyota," the object detection process may use this information to identify a car, and in particular, a Toyota car. Alternatively, or additionally, the object detection is informed by optical charter recognition and other natural language recognition processes. For example, the image data is analyzed to identify the word "Toyota" on a car, which informs the image identification process to determine that an object identified as a car is specifically a Toyota car. As another example, the computing system identifies the word "Picasso" on a plaque next to a painting to determine that the painting is a Picasso. Non-text-based image markers can also be used to identify additional information about an object. For example, based on identifying the Toyota logo on a car, the computing system determines that the car is a Toyota.

Alternatively, or additionally, the object detection includes use of one or more machine learning models. In some aspects, a machine learning model is trained on images scraped from the internet to be able to identify art by different artists (e.g., a Picasso vs. a Rembrandt), cars by different makers, different varieties of trees, and so forth. Such information may be stored by the computing system for subsequent offline use.

In some aspects, the object identification is informed by user feedback. For example, if the image data includes multiple cars, paintings, etc., the computing system prompts a user to select (e.g., by tapping a touchscreen) a particular object of interest for disambiguation.

In some implementations, after objects are extracted from the images, each image space object detection is projected into the 3D world space using the spatial information (e.g., using estimated camera poses and depth maps). The objects are spatially clustered to form localized objects in the 3D scene.

At step 212, the computing system generates text based on the voice data and the keyword. In some examples, the generated text includes some or all of the speech received at step 206. In some examples, the generated text includes a subset of the speech received at step 206, based on the keyword and object detection. For example, the received speech is "This is the new couch, and this is a big picture window." Based on the identified keywords "couch" and "window" and couch and window objects identified in the room, "This is the new couch" is identified as first text associated with the couch object, and "this is a big picture window" is identified as second text associated with the window object.

At step 214, the computing system stores the text in association with the object. In some aspects, the computing system associates the text with the respective object or objects using anchors. An anchor is a point in space to be tracked. Anchors can be used in XR environments to identify placement of an object in space and ensure that objects appear to stay at the same position and orientation in space. In some examples, the computing system stores anchor positions in local XR space.

In some aspects, anchors include data associated with one or more points in space. In some aspects, the computing system associates each salient remark with a localized object. For example, "this tree needs to be cut down" is associated with a tree that is shown when that narration was gathered. In some examples, each salient remark is matched with the localized object with maximum pairwise semantic similarity (above a minimum threshold) from the set of localized objects visible to the camera during the time interval in which the remark was made. Each localized object matched to at least one salient remark is returned as corresponding to a spatio-semantic anchor.

Various types of information can be stored in association with an anchor. It should be noted that there is no limit to what data can be stored in association with an anchor, as long as the information associated with the anchor can be easily visualized with respect to a viewer's coordinate system. Some examples of data stored in association with the anchor in various embodiments include:

Location of the anchor with respect to the origin of the dataset. Typically, the origin in uncalibrated XR is the real-world position of the XR device when the XR application starts (e.g., the data collection part of the application), along with the coordinate axes determined by the camera pose and the gravitational direction defined by the IMU.

Description(s)/content: the context-aware information associated with each anchor, description of each tagged object, etc.

Inferred object: as extracted by the object-level anchor.

Intended viewpoint(s): the RGB (red-green-blue) frame or video clip best representing where the user should look at for the content, i.e., the frame occurring during the midpoint of the paragraph. Since people can look at anchors from any angle in XR, it it useful for the computing system to keep track of which direction is being referred to or what it looked like when it was narrated in case of environmental changes.

Location history: including all previous anchor locations to track the traversed locations over time. This tracks the change in location as information about the anchor is updated over time, e.g., if multiple people document the same space and contribute to a shared spatial document.

Social and crowd-sourcing information: including comments by other users.

Anchor tag(s): abstract vs. concrete, information vs. event (e.g., campus tour), professor vs. lab (e.g., PhD tour—can provide semantic information such as the relationship between professors, their students, their research groups, lab spaces, etc.), task vs. note (e.g., contract work/form). Used to affect how the anchor is visualized during runtime.

Application/document type(s): Used to filter anchors by application context. Multiple applications can share the same spatial document and different hierarchies of anchors can be constructed for different applications of the same spatial documents.

Parent anchor and list of child anchor(s): allowing for bidirectional hierarchy traversal (e.g., 123 Pacific Drive, as illustrated in FIG. 8).

Bounding box: vertex coordinates defining the extent of contents to be visualized with respect to the XR coordinate frame.

Storing the text in association with the object can include storing any and all such anchor information. For example, in some embodiments, storing the text in association with the object includes storing an anchor location with respect to a position of the computing device, storing information characterizing an intended viewpoint, and storing the text in association with the anchor location and the information characterizing the intended viewpoint. Storing data in association with other data in various embodiments includes storing the data to a common file, storing the data linked to the other data, and/or the like.

In some examples, anchors summarize text to capture the place-based experience. For each type of application (e.g., real estate tour, maintenance, campus tour, intelligent checklist, etc.), the anchor content may vary.

In some aspects, the computing system applies a sensor fusion algorithm that allows the creation of spatial documents by combining audio, video and sensor data in a way that is sensitive to both the user's position and orientation. Both the author's XR frame and then later the viewer's XR frame, are considered in the projection of the text. A major challenge in XR is robustness of tracking, localization, segmentation, semantic understanding, etc., which is particularly challenging on consumer devices such as mobile phones with limited sensors. With creative use of multiple sensors and multiple XR devices (a "network" of XR sensors), as well as stochastic measurements, the digital and real world can be linked, even with the imposed restrictions.

In some examples, associating the text with the object includes computing a set of weights for each of a set of data channels. Data channels can include RGB color, audio, tracking data, pose, and the like. With the set of weights, W (e.g., a weight vector), and the input data, x, the computing system computes a saliency value. For example, the saliency value is given by:

$$s = W \times x$$

In some aspects, the weights, W, will be different depending on the application, even with the same dataset. For example, a narration (tour) will give more weight to the audio channel, while a visual walkthrough (maintenance, checklist) may focus more on tracking data (e.g., low changes in trajectory may imply the user is looking at an object of interest (OOI)). In some examples, the computing system also computes extra features as needed and adds entries for the new features in the weight vector. For example, the computing system generates a transcription of the audio, and adds an entry for the audio transcription to the weight vector. As another example, the computing system identifies and tracks people in images of a festival and adds an indication of the human tracking to the weight vector. Thus, in some embodiments, the computing system establishes a set of weights, each weight corresponding to a type of image, audio, or sensor data based on an accuracy thereof. The computing system computes a saliency value as a function of input data and respective weights of the set of weights. The weights and/or the saliency value are further stored in association with the object and the text.

In some aspects, both Global Positioning System (GPS) and/or compass data, as well as natural image markers, are mixed and weighed depending on the accuracy of each method. When GPS location information is determined, an accuracy of the GPS is also determined. Based on the accuracy, different features can be weighted more or less for determining an anchor position. Since GPS quality is not as accurate indoors, but natural image markers are typically abundant, indoors, natural image markers are weighted more heavily than GPS indoors. Likewise, GPS is relatively accurate outside, whereas natural image markers are more dispersed outdoors. GPS in some examples is weighted more heavily than natural markers outdoors. Alternatively, or additionally, if the XR device has a depth sensor, the computing system performs 3D object detection and 3D object markers are used and weighted.

In some aspects, to associate extracted (language) context with the corresponding objects, saliency is determined by finding matches between the transcription and objects visible within each image frame (as determined by object detection/tracking systems, like YOLO-X). In some examples, the computing system operates under the assumption is that when a voice recording or text input is given within an image frame, an object of interest is within the viewing frustum of that image frame. In some examples, upon identifying such a correlation, the computing system associates the text with the object by storing the text in association with data characterizing the object (e.g., object name, object coordinates, corresponding image frame(s), etc.).

In some aspects, using the transcription and identified sentences therein generated at step 208 (above), the computing system merges sentences into the same contextual description for one anchor location associated with a location. In parallel, the computing system identifies anchors to associate with each text segment and groups spatially related text segments together under a node.

In addition to anchoring an object in a room to text, the computing system may also manage more abstract anchors (e.g., the entire building, the view, the living room, etc.). In some examples, for such abstract anchors, the computing system performs further holistic analysis of both context and object-level analysis up to a higher level in the hierarchy of anchors. (See anchor hierarchy depicted in FIG. 8). This process can be repeated all the way up to the root of the hierarchy of anchors.

In some aspects, generating the text includes encoding a spatial document. In various examples, a spatial document includes text, supplementary data, and/or metadata. In some examples, a spatial document stores text in association with an anchor and orientation information. The computing system structures the text, supplementary data, and/or metadata into a hierarchical spatial document to generate the spatial document. The spatial document may be stored in or in association with an anchor.

In various example, the spatial document is hierarchical. The spatial document includes a hierarchical spatial-semantic information infrastructure. This includes hierarchical structures of 3D objects in which the parent and children node need not necessarily be related. In some aspects, the spatial document structure additionally incorporates the semantic information of the text to define relationships between the nodes, including semantic groupings and relationship inferences.

In some examples, the spatial document encapsulates information including the text, hierarchy, and/or metadata. For example, a spatial document includes one or more of the following:

Root anchor

GPS coordinates and compass magnetic north with respect to the XR coordinate frame used to initialize the dataset. For example, the XR origin is 0,0,0 in the dataset, but to situate it in geospatial coordinates, the computing system converts the traditional latitude/longitude degrees into meters (e.g., GPS format) for compatibility with 3D rendering platforms.

Creation date, owner, contributors, sharing rules, etc. (e.g., metadata specifying information such as a date and a user that created the spatial document).

Document name.

Tracking reference(s) (GPS, image marker, etc.). Different applications may use different methods of initializing or correcting the spatial document with respect to the user.

With this information, the spatial document ends up being a large hierarchical structure in which each node contains metadata and other content. Thus, a natural data structure for the spatial document is JSON (JavaScript Object Notation), which supports anchors containing different types of data, different structures, etc. This is the intermediary storage format as highlighted in FIG. 6.

In some aspects, the computing system tracks rooms and/or floors in a building as a user moves the computing device through the building. For example, based on the image data, the spatial information, and the voice data, the computing system identifies and tracks one or more floors in a building. The spatial information used for tracking floors can include GPS data and gyroscope data, and/or pressure data gathered from a pressure sensor.

At step 216, the computing system generates and provides output comprising the text linked to the identified object or a derivative thereof. The text can be linked to the object or derivative thereof by being displayed in association with the object or derivative thereof. Alternatively, or additionally, an interface element configured to fetch and display the text is displayed in association with (e.g., near) the object or derivative thereof. In various examples, derivatives of the object include computer-generated versions of the object. These computer-generated objects can be altered (e.g., color or size changed, dog turned into a cat, etc.) in some examples.

In some examples, to generate and display the output, the computing system overlays the text with newly captured or stored images. The computing system captures second image data, which can involve capturing real-time scene information as the camera moves around. Alternatively, the second image data can be a single image, loaded or captured in real time. The computing system identifies information in or associated with the image data. This can include identifying one or more image markers in the image data. For example, a distinctive sign or plaque is included in the image. As other examples, the information identified can include GPS coordinates, pose, or other tracking-related information. The computing system traverses stored image data to identify the information. For example, the computing system traverses the stored image data to identify the image markers. As another example, the computing system traverses stored image data to identify GPS coordinates. In either case, the computing system can determine that the second image data is correlated to the first image data and identify text for presentation based on the correlation. The computing system retrieves the generated text based on an association with the stored image data and retrieves data identifying an object in the stored image data (e.g., an anchor). The computing system aligns a corresponding object (i.e., a second object) in the second image data and the object in the stored image data. The computing system overlays the text on the object based on the alignment.

In some embodiments, the computing system performs geospatial alignment. The computing system gathers sensor data such as compass and GPS information to identify an orientation of the computing device. This can adjust the tracking and placement of anchors in the new image(s) vs. the original image(s).

An encoded spatial document can be visualized, or consumed, in multiple ways. Examples include visualization in Augmented, Mixed or Virtual Reality (e.g., XR). Moreover, the structure of the spatial document allows the document to be segmented or flattened without loss of the meaningful semantic structure and overlayed onto a lower dimensional document or decomposed into linked documents (e.g., in HyperText Markup Language (HTML)).

In various examples, spatial documents can be consumed in a "flattened" 2D form. For example, a house is flattened to a 2D image. Text can be overlaid thereon in 2D or popped up in immersive 2.5D text bubbles. In some embodiments, even in the "flattened" presentation, the semantic relationships between representative images and anchors are preserved. In alternative embodiments, the semantic relationships between representative images and anchors are removed in the "flattened" version to save space.

The spatial document can be consumed in "constructed" virtual reality, overlayed on idealized virtual reality (3D), consumed in "flattened" 2D projections of constructed reality, overlayed on idealized 2D maps of reality, consumed in Augmented Reality (or mixed reality in implementations in which the documents are interactive) or consumed in as a decomposed, yet semantically linked collection of document fragments (e.g., a website). As a specific example, a reconstructed virtual reality can be created from phone capture. Precise registration using the information underlying our XR anchors makes this possible (e.g., using tracking data and techniques such as SLAM).

In some aspects, the computing system displays an image or set of images, which can include a real-time depiction of a scene as viewed by the camera. Alternatively, or additionally, the image is a previously captured image. Alternatively, or additionally, the image is a virtual computer generated image. The computing system identifies anchors that correspond to objects in the image or set of images. The computing system outputs the set of all such anchors. In various examples, the anchors are inserted according to their spatial positions into a 3D reconstruction of the scene to form an immersive document. The immersive document allows user interaction with aspects of the scene, as well as user access to relevant text. The user can experience self-guided exploration within the scene.

In some examples, the text is displayed proximate to the object. For example, the spatial document, including the text, is displayed in an AR environment in connection with a live image including the object (i.e., on a view screen 414 as shown in FIG. 4). As another example, the spatial document, including the text, is displayed in a VR environment generated based on a real-world scene to include a computer-generated version of the generated object (e.g., one example of a derivative of the object, such as that depicted in example 410 of FIG. 4).

As noted above at step 204, secondary information can be stored during the tracking process. This tracking information can be to infer anchors, their semantics, and their information. The secondary information can also be used for non-anchor tasks (e.g., GPS/compass is used for registration during runtime).

In some aspects, as a user views and navigates through a scene, the computing system performs XR tracking to continuously determine the user's position in relation to various anchors in the environment. The tracking process is handled differently depending on the setting (e.g., indoors or outdoors). For example, in an outdoor setting, GPS or other global indicators (e.g., a static image or sign on a building) are used to align multiple local XR perspectives. The tracking process is further adjusted depending on the availability of image markers (e.g., signs, logos, and other contextual information in an image).

When outdoors, the computing system performs tracking relying partially or entirely on GPS. In XR, the coordinate system is generally initialized based on where the XR device is pointing. This causes translational and rotational alignment problems. In some examples, to solve the translation problem, upon launching, the computing system records GPS samples over several frames when the user is standing in roughly the same location. The computing system shifts the XR coordinate frame to align with the viewer's coordinate frame. To solve the rotation problem, the computing system obtains compass data. The compass data provides a global indication of magnetic north. The computing system rotates the virtual world around the viewer's head such that both the author and viewer's magnetic north vectors point in the same direction.

When indoors, GPS is generally not useable to initialize the exact starting position of the spatial document. To address this, in some aspects, the computing system uses GPS to correct the spatial document location over time using a Kalman filter (merging sensor information from the XR tracking and GPS/compass) and a bounding box. Based on the assumption that the spatial document should remain indoors, then GPS understanding of the building (e.g., using an API such as Open Street Map), can be used to make corrections such that the anchors remain indoors.

When outdoors or indoors and relying on image markers, while the typical strategy is to make up a recognizable image, print it, and stick it to the environment, but this is not a scalable solution. In some aspects, a scalable solution is provided by using "natural markers," which are scans of 2D surfaces that naturally exist in the environment, such as building signs, logos, posters, etc. The computing system can then find such surfaces using border detection, skew, etc.

During the authorship stage, such markers can be proposed to the user. Alternatively, or additionally, the markers are stored automatically as with persistent coordinate frames and/or world anchors.

In some aspects, the spatial document is updated. For example, when a user views the object with the text as output at step 214, the user can extend the spatial document (e.g., by commenting, linking, and/or appending). The computing system supports updating the spatial document over multiple sessions. In some examples, a viewer comments on an anchor, and the comment is added to update the spatial document. This can be performed by storing the text in association with the anchor as described above. The text will then be displayed as a new comment, e.g., in a new comment bubble as shown in FIG. 3.

Alternatively, the computing system in some situations determines that it is more appropriate to merge the new text with the previous text (e.g., by augmenting text in a comment bubble). If the proposed anchor refers to the same content, then the computing system may merge anchors in different ways depending on the applications. For example, the new text is appended to the description. Alternatively, or additionally, the computing system applies NLP to merge the descriptions. Alternatively, or additionally, the computing system uses a novel viewpoint to improve the object's reconstruction or semantic understanding.

As another example, a new author creates a document of the same space by exploring the space in-person, and generating a new text associated with a new object. In this case, the computing system can update or create anchors depending on the coverage of existing anchors. If a new author is documenting uncharted territory that is not covered by an existing anchor's location or content at all, the computing system generates a new anchor. If their proposed anchor is close to an existing anchor but does not face the same object or refer to the same content, the computing system creates a new anchor, also ensuring that the anchors are sufficiently separated for user experience purposes. In some aspects, the computing system receives a second text, which can be derived from transcripting user voice input and/or from a user typing the text. The computing system identifies a relationship between the second text and the first text or the object. For example, the second text may be manually appended to the first text, or the computing system determines that the second text refers to the same object and should be attached to the same anchor as the first text. The computing device updates the stored text in association with the object to comprise the second text and an indication of the relationship. The indication of the relationship, can, in various examples, specify that the first text and the second text are part of the same spatial document/attached to the same anchor. As another example, the relationship can be that the first text is associated with one spatial document attached to one object/anchor, and the second text is associated with another spatial document attached to another object/anchor. The first and second text may be received from the same user or different users. For example, the first text is received from a first user and the second text is received from a second user.

In some examples, anchors are split. For example, in Session 1, a user very vaguely mentions a secondary object. The computing system determines that the secondary object is not segmentable from a primary object and merges the anchors for the two objects. In Session 2, a user further documents the secondary object. The computing system determines based on the further documentation to split the anchors to handle the secondary and primary objects separately.

In various examples, a user can interact with a spatial document by appending, linking, clicking links or checking checkboxes. As a specific example, a user can add comments to append to a spatial document. Several time stamped comments can be included in a given spatial document. As another example, spatial documents can expand to show more content. This can be triggered by focusing the camera on an object, walking near the object, clicking on the object or an associated comment on a screen, or other suitable means.

The spatial documents are useful in various settings. For example, spatial documents can be used in a real estate application to indicate features in a house or apartment. As another example, spatial documents can be used leaving instructions for maintenance people or cleaners. For example, a virtual note can be left asking a cleaner to check for mold. In further examples, spatial documents can be used to guide a user to fill forms or provide other information. As a specific example, spatial forms are provided in which the anchors are tasks that need to be filled in by the user for a particular local space such as a vehicle inspection, tenant's house inspection, etc. Spatial documents can be further applied to situations like accidents, which require forms to be filled out on the spot. Alternatively, or additionally, for a car inspection report, the computer vision techniques can be extended to identify dents or other irregularities and automatically generate the report as the user moves the camera around the car.

The techniques described herein provide several advantages. Improved tracking techniques are provided, with reduced drift and increased accuracy of alignment. In traditional tracking systems, a significant vertical drift of about 15 m is seen over a relatively short and straight path of 0.5 miles. This is enough to create mistakes such as confusing floors of a building, which is not suitable for creating hierarchical spatial documents as described herein. Other prior systems exhibit tracking loss when navigating through a large environment. The improved tracking techniques include use of data integrated from multiple sensors and potentially multiple computing devices (e.g., different users' smart phones). The various data types are weighted based on accuracy. With these improved techniques, continuous, unique journeys can be mapped across multiple elevations without vertical ambiguity.

Additional improvements include ease of use and user experience improvements. Traditionally, while systems exist to aid a user in generating XR content, it usually requires complicated input that requires a great deal of knowledge of the software involved. Using the techniques described herein, the user can simply speak as they navigate through an environment, and the system automatically generates XR content based on the speech.

FIG. 3 is an example illustrating an XR scene 300 with image and text, according to certain embodiments. The XR scene 300 depicts a room and several objects in the room, including a floor 302 and a table 304. Each object is labeled with a respective text annotation. The floor 302 has a first text annotation 306, in the form of a text bubble with the text "Normally, when there is no lockdown, this is the ground floor cafe." The table 304 has a second text annotation 308, in the form of a text bubble with the text "And that entire side of the building is filled with labs." Using the techniques described herein, anchors are established for the respective objects, and the corresponding text is displayed when the object is within the field of view of the computing device's camera.

FIG. 4 is a schematic overview of spatial document generation and consumption techniques, according to certain embodiments of the present disclosure. At 402, data is captured in AR, including image data, sensor data, and voice data, as described above with respect to steps 202-206 of FIG. 2. At 404, the anchor creation pipeline is executed. A spatial document is created with anchors, as described above at step 214 of FIG. 2. At 406, the spatial document is consumed (i.e., provided to a user). The spatial document can be consumed in multiple ways, as described above with respect to step 216 of FIG. 2.

FIG. 4 further illustrates several contexts in which the spatial document can be used. Output example 408 is one application of spatial documents attached to semantic spatial anchors in augmented reality. In this example, spatial documents are attached to anchors in an outdoor scene (e.g., to leave notes for a landscaper). This can be provided in the form of an image to share with the landscaper. In other examples, spatial documents are attached to semantic spatial anchors in virtual reality. Output example 410 is an example in which anchor points are "hooked" onto dollhouse maps such as a 2.5 dimensional map as depicted in FIG. 4. The spatial documents are attached to these anchor points. In other examples, a flattened version of constructed reality is created, and spatial documents are attached to anchor points in a flattened two-dimensional representation. Output example 412 is an example in which a user is viewing spatial documents on a mobile phone, overlaid on a real-world scene in an AR environment. Other examples include spatial documents authored for a campus tour using snapshot registration, a museum tour including spatial documents anchored to art works in an AR environment, and a tour of an apartment for sale including spatial documents anchored to key apartment features in an AR environment.

FIG. 5 is a schematic overview 500 of example spatial document generation techniques, according to certain embodiments of the present disclosure. At step 502, raw RGB images are obtained (e.g., using a camera of the computing device). At step 504, the computing device extracts framewise detections. At step 506, the computing system performs object detections. The computing system identifies one or more objects from the raw RGB images. At step 508, the computing system determines estimated camera poses. At step 510, the computing system determines estimated depth images. As described above with respect to FIG. 2, the computing system may use sensor data and techniques such as SLAM to track pose and depth in association with the images.

At step 512, the computing system projects and associates object centers. The computing system uses the estimated depths and camera poses to identify centers of the detected objects. At step 514, the computing system maps localized 3D objects. For example, the computing system identifies and stores the 3D locations of the identified objects.

The computing system further analyzes a video transcript 516. The video transcript 516 includes audio data. The computing system extracts the audio data (extractive summarization 518) an analyzes the audio data to extract text (extracted remarks 520).

At step 524, the computing system generates object-text associations. For example, particular text is associated with particular objects based on keywords identified in the extracted remarks, as described above with respect to FIG. 2. At step 526, the computing system establishes spatio-semantic anchors. For example, the computing system anchors the text to the objects so that when the object is viewed at a later time, the text will be displayed.

FIG. 6 is a high level overview 600 of a spatial document generation and consumption pipeline, according to certain embodiments of the present disclosure. The overview 600 is a high-level pipeline of data processing pipeline from creation to consumption. The pipeline leverages automated segmentation and linking to the extent possible but allows manual editing and document extension. At step 602, image, sensor, and voice data is collected. This can include various data types, such as .mp4 files, .aac files, .srt files, .txt files, and the like. At step 604, the computing system performs automated post-processing. Automated post-processing can include, for example, transcribing audio to text, text analysis, object recognition, and the like, as well as linking text to objects using anchors as described herein. Automated post-processing can also include gathering additional data, such as stored or online data to help identify an object. At step 606, the computing system performs manual post-processing. Manual post-processing is post-processing based on user input, such as a user clicking on and editing a text box or dragging and moving a text box to another location. At step, 608, the spatial document is consumed. The spatial document is oriented and displayed in an XR environment, as described above with respect to step 214 of FIG. 2. The spatial document can be output in various formats, including .app, .apk, .exe, and .pdf, as shown in FIG. 6.

FIG. 7 is a schematic diagram 700 of an audio pipeline for use is spatial document generation and updating. Time-stamped segments of dialog are associated with the narrator's location and the video images in view. These dialog fragments are later processed (concatenated and abstracted) to create the text in the anchored spatial document.

Starting with video data 702, audio data 704 is extracted. The computing system transcribes text 706 from the audio data 704. The text 706 is divided into segments associated with timestamps. The computing system analyzes the transcription by parsing the sentences based on temporal proximity. The text is also associated with spatial data to generate a space-centric data structure 708 with coordinates and text. In some aspects, the computing system groups spatially related text segments together under a node. These data structures are used to determine where to display the text in relation to a scene in output 710.

FIG. 8 is an example of a spatial document hierarchy 800, according to some embodiments. The spatial document hierarchy 800 in this example stores information establishing a relationship between rooms in a house. Rooms can be inferred through the narrator's location and narration. Floors can be inferred through a combination of GPS, sensors and video analytics. The geo-spatial location and address can be inferred from GPS, search and text recognition if available.

Specifically, in this example, the spatial document hierarchy 800 has a root node of the home address 802, 123 Pacific Drive. Each floor is a branch of this node—first floor 804, including living room 806, and second floor 814, including master bedroom 816. For each room, another level is stored establishing objects in that room. For the living room 806, objects stored to the spatial document hierarchy 800 include couch 808, lamp 810, and floor 812. For each object, room, and floor, supplementary information is stored, such as camera pose, GPS coordinates, etc., for identifying the object or region. Images such as image 805 of the living room 806 are also stored to the spatial document hierarchy 800. For the master bedroom 816, objects stored to the spatial document hierarchy include floor 818, bed 820, and view 822. Images, such as image 815, are also stored in association with the master bedroom 816.

FIG. 9 illustrates an example user interface 900 for guiding a user to configure a spatial document, according to some embodiments. A user 902 interacts with a spatial form anchored to salient parts of a car 904. The user interface 900 includes elements to guide a user to take pictures to include information useful for the processes described herein. In this example, text bubbles 906 of a spatial document have already been configured. The user 902 can interact with the user interface 900 to adjust placement of, or remove, the text bubbles 906. The computing system has determined that license plate information would be useful for updating the spatial document. The user interface 900 presents an instruction 908 to take a picture of the license plate. Back 910 and done 912 buttons are also displayed to go back or complete the interaction, respectively. Such interfaces can guide a user to provide supplemental information or clarify ambiguities for improved spatial document production as described herein.

Any suitable computing system or group of computing systems can be used for performing the operations described herein. For example, FIG. 10 depicts examples of a computing device 1000 that executes an XR framework subsystem 104 and an object-document mapping subsystem 106 (as described above with respect to FIG. 1).

The depicted examples of a computing device 1000 includes a processor 1002 communicatively coupled to one or more memory components 1004. The processor 1002 executes computer-executable program code stored in a memory component 1004, accesses information stored in the memory component 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including a single processing device.

The memory component 1004 includes any suitable non-transitory computer-readable medium for storing data, program code (e.g., executable instructions), or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing device 1000 may also include a number of external or internal devices, such as input or output devices. For example, the Computing device 1000 is shown with one or more input/output ("I/O") interfaces 1008. An I/O interface 1008 can receive input from input devices or provide output to output devices. One or more buses 1006 are also included in the computing device 1000. The bus 1006 communicatively couples one or more components of a respective one of the computing device 1000.

The computing device 1000 executes program code that configures the processor 1002 to perform one or more of the operations described herein. The program code may correspond to the XR framework subsystem 104 and the object-document mapping subsystem 106 and/or other suitable applications that perform one or more operations described herein. The program code may be resident in the memory component 1004 or any suitable computer-readable medium and may be executed by the processor 1002 or any other suitable processor. In some embodiments, the XR framework subsystem 104 and the object-document mapping subsystem 106 are stored in the memory component 1004, as depicted in FIG. 10. In additional or alternative embodiments, one or more of the XR framework subsystem 104 and object-document mapping subsystem 106 are stored in different memory components of different computing systems. In additional or alternative embodiments, the program code described above is stored in one or more other memory components accessible via a data network.

In some embodiments, one or more of these data sets, models, and functions are stored in the same memory component (e.g., the memory component 1004). For example, a device, such as the computing system 100 depicted in FIG. 1, can host the XR framework subsystem 104 and object-document mapping subsystem 106. In additional or alternative embodiments, one or more of the programs, data sets, models, and functions described herein are stored in one or more other memory components accessible via a data network.

The computing device 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, and the like. The computing device 1000 is able to communicate with one or more other computing devices via a data network using the network interface device 1010.

In some embodiments, the functionality provided by the computing device 1000 may be offered as a cloud-based spatial document service 1100 by a cloud service provider. For example, FIG. 11 depicts an example of a cloud-based spatial document service 1100 offering one or more spatial document services that can be used by a number of user subscribers using user devices 1110A, 1110B, and 1110C across a network 1108. In certain embodiments, the spatial document services provided by the spatial document service 1100 include a service that generates an AR scene including virtual graphics based on configuration parameters and graphic elements supplied by the user devices 1110A, 1110B, and 1110C. In some cases, the spatial document services may be offered under a Software as a Service (SaaS) model. One or more users may subscribe to the spatial document services, and the spatial document service 1100 performs the processing to provide the spatial document services to subscribers. The spatial document service 1100 may include one or more remote server computer(s) 1102.

The remote server computer(s) 1102 include any suitable non-transitory computer-readable medium for storing program code (e.g., code for the XR framework subsystem 104 and/or object-document mapping subsystem 106), which is used by the spatial document service 1100 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computer(s) 1102 can include volatile memory, non-volatile memory, or a combination thereof.

One or more of the server computer(s) 1102 execute the program code (e.g., via the XR framework subsystem 104 and object-document mapping subsystem 106) that configures one or more processors of the server computer(s) 1102 to perform one or more of the operations that provide interactive spatial document services, such as generating and rendering virtual graphics based on a tracked object. Any other suitable systems or subsystems that perform one or more operations described herein (e.g., a subsystem for generating tracking information) can also be implemented by the spatial document service 1100.

In certain embodiments, the spatial document service 1100 may implement the services by executing program code and/or using program data, which may be resident in a memory component of the server computer(s) 1102 or any suitable computer-readable medium and may be executed by the processors of the server computer(s) 1102 or any other suitable processor.

The spatial document service 1100 also includes a network interface device 1106 that enables communications to and from the spatial document service 1100. In certain embodiments, the network interface device 1106 includes any device or group of devices suitable for establishing a wired or wireless data connection to the network 1108. Non-limiting examples of the network interface device 1106 include an Ethernet network adapter, a modem, and/or the like. The spatial document service 1100 is able to communicate with the user devices 1110A, 1110B, and 1110C via the network 1108 using the network interface device 1106.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
capturing image data using a camera;
capturing spatial information using one or more sensors;
receiving voice data using a microphone;
analyzing the voice data to identify a keyword;
analyzing the image data and the spatial information to identify an object corresponding to the keyword;
generating text based on the voice data and the keyword;
storing the text in association with the object; and
generating and providing output comprising the text linked to the object or a derivative thereof, wherein generating the output comprises:
capturing second image data;
identifying one or more image markers in the second image data;
traversing stored image data to identify the image markers;
retrieving the generated text based on an association with the stored image data;
retrieving data identifying the object in the stored image data;
aligning a second object in the second image data with the object in the stored image data; and
overlaying the text on the object based on the alignment.

2. The method of claim 1, wherein the method is performed by a computing device and storing the text in association with the object comprises:
storing an anchor location with respect to a position of the computing device;
storing information characterizing an intended viewpoint; and
storing the text in association with the anchor location and the information characterizing the intended viewpoint.

3. The method of claim 1, further comprising:
establishing a set of weights, each weight corresponding to a type of image, audio, or sensor data based on an accuracy thereof; and
computing a saliency value as a function of input data and respective weights of the set of weights, wherein the weights and the saliency value are further stored in association with the object and the text.

4. The method of claim 1, wherein the text is a first text, the method further comprising:
receiving a second text;
identifying a relationship between the second text and the first text or the object; and
updating the stored text in association with the object to comprise the second text and an indication of the relationship.

5. The method of claim 4, wherein the first text is received from a first user and the second text is received from a second user.

6. The method of claim 1, further comprising:
based on the image data, the spatial information, and the voice data, identifying and tracking one or more floors in a building,
wherein the spatial information comprises GPS data and gyroscope data.

7. The method of claim 1, further comprising storing, with the text in association with the object:
metadata specifying a date and a user.

8. A system comprising:
a memory component; and
a processing device coupled to the memory component, the processing device to perform operations comprising:
capturing image data using a camera;
capturing spatial information using one or more sensors;
receiving user input associated with the image data;
analyzing the user input to identify a keyword;
analyzing the image data and the spatial information to identify an object corresponding to the keyword;
generating text based on the user input and the keyword;
storing the text in association with the object; and
generating and providing output comprising the text linked to the object or a derivative thereof, wherein generating the output comprises:
capturing second image data;
identifying one or more image markers in the second image data;
traversing stored image data to identify the image markers;
retrieving the generated text based on an association with the stored image data;
retrieving data identifying the object in the stored image data;
aligning a second object in the second image data with the object in the stored image data; and
overlaying the text on the object based on the alignment.

9. The system of claim 8, wherein the operations are performed by a computing device, the operations further comprising:
storing an anchor location with respect to a position of the computing device;
storing information characterizing an intended viewpoint; and
storing the text in association with the anchor location and the information characterizing the intended viewpoint.

10. The system of claim 8, the operations further comprising:
establishing a set of weights, each weight corresponding to a type of image, audio, or sensor data based on an accuracy thereof; and
computing a saliency value as a function of input data and respective weights of the set of weights, wherein the weights and the saliency value are further stored in association with the object and the text.

11. The system of claim 8, wherein the text is a first text, the operations further comprising:

receiving a second text;

identifying a relationship between the second text and the first text or the object; and updating the stored text in association with the object to comprise the second text and an indication of the relationship.

12. The system of claim 11, wherein:

the first text is received from a first user and the second text is received from a second user.

13. The system of claim 8, the operations further comprising:

based on the image data, the spatial information, and the user input, identifying and tracking one or more floors in a building, wherein the spatial information comprises GPS data and gyroscope data.

14. A non-transitory computer-readable medium storing executable instructions, which when executed by a processing device, cause the processing device to perform operations comprising:

capturing image data using a camera;

capturing spatial information using one or more sensors;

receiving voice data using a microphone;

analyzing the voice data to identify a keyword;

analyzing the image data and the spatial information to identify an object corresponding to the keyword;

generating text based on the voice data and the keyword;

storing the text in association with the object; and generating and providing output comprising the text linked to the object or a derivative thereof, wherein generating the output comprises:

capturing second image data;

identifying one or more image markers in the second image data;

traversing stored image data to identify the image markers;

retrieving the generated text based on an association with the stored image data;

retrieving data identifying the object in the stored image data;

aligning a second object in the second image data with the object in the stored image data; and overlaying the text on the object based on the alignment.

15. The medium of claim 14, wherein the operations are performed by a computing device, the operations further comprising:

storing an anchor location with respect to a position of the computing device;

storing information characterizing an intended viewpoint; and storing the text in association with the anchor location and the information characterizing the intended viewpoint.

16. The medium of claim 14, the operations further comprising:

establishing a set of weights, each weight corresponding to a type of image, audio, or sensor data based on an accuracy thereof; and computing a saliency value as a function of input data and respective weights of the set of weights, wherein the weights and the saliency value are further stored in association with the object and the text.

17. The medium of claim 14, wherein the text is a first text received from a first user, the operations further comprising:

receiving a second text from a second user;

identifying a relationship between the second text and the first text or the object; and updating the stored text in association with the object to comprise the second text and an indication of the relationship.

\* \* \* \* \*